Figure 1:
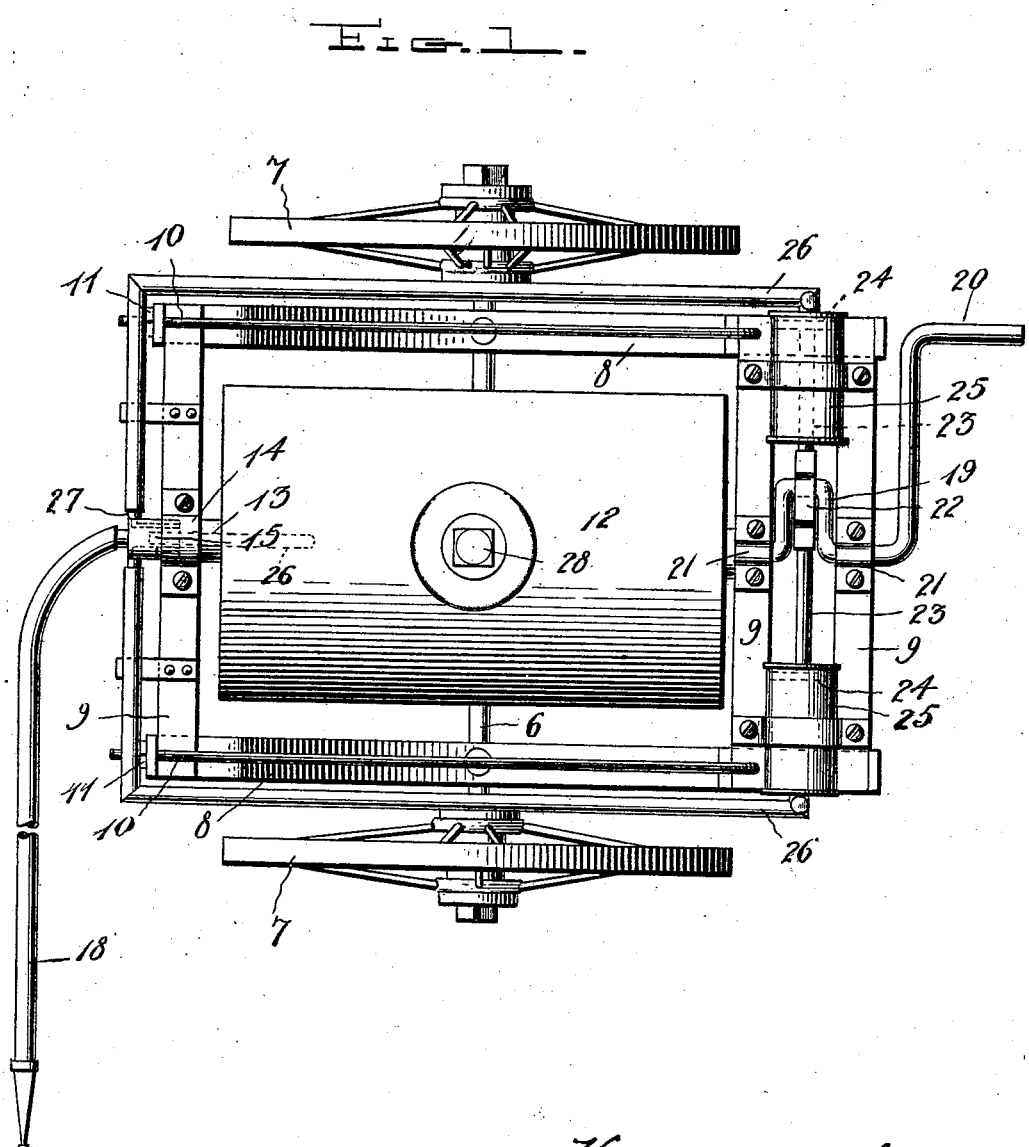

No. 855,496. PATENTED JUNE 4, 1907.
H. BARBER.
LIQUID DISTRIBUTING APPARATUS.
APPLICATION FILED OCT. 26, 1906.

2 SHEETS—SHEET 1.

Herman Barber,
Inventor

Witnesses.

No. 855,496. PATENTED JUNE 4, 1907.
H. BARBER.
LIQUID DISTRIBUTING APPARATUS.
APPLICATION FILED OCT. 26, 1906.
2 SHEETS—SHEET 2.
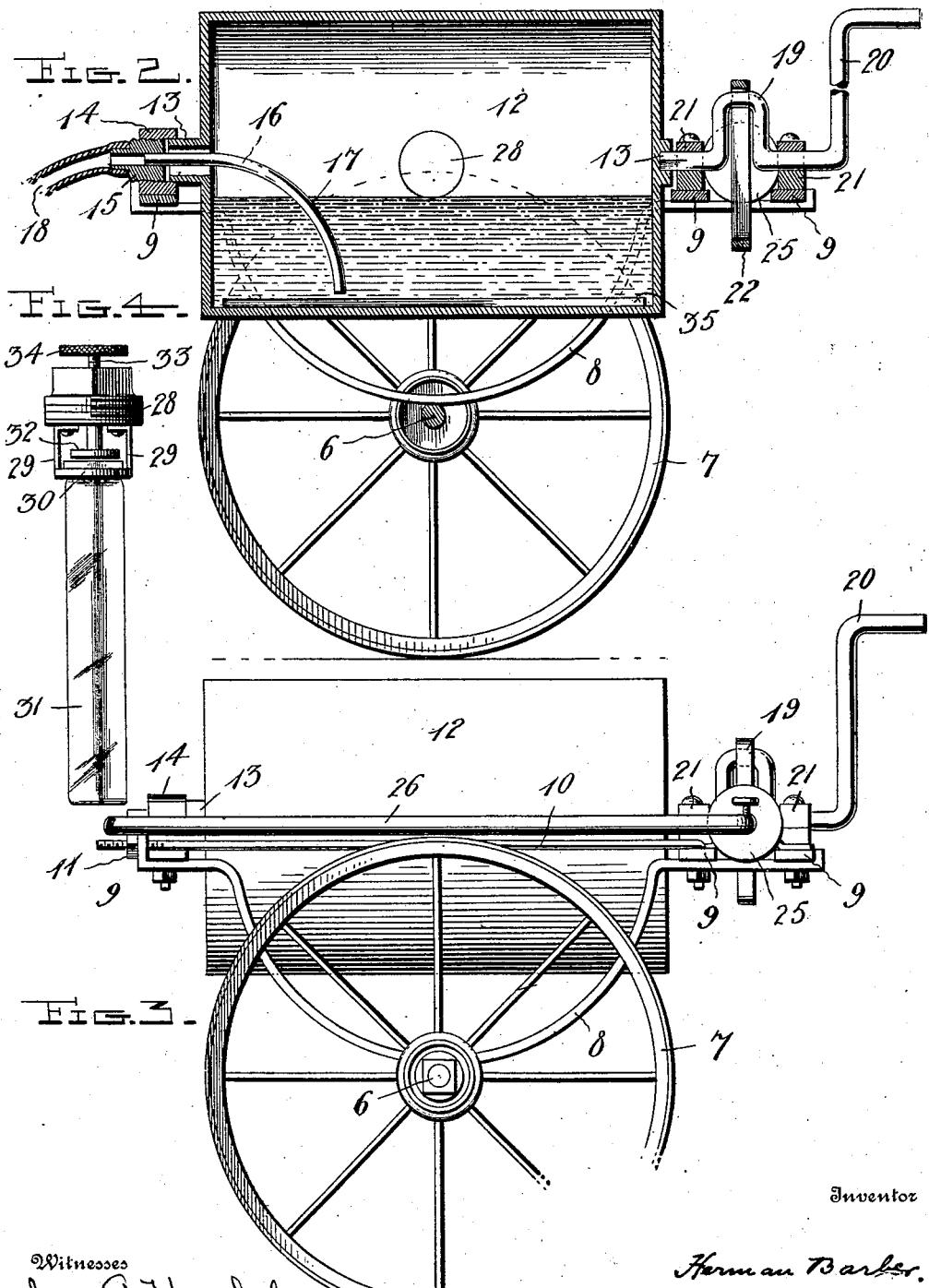

UNITED STATES PATENT OFFICE.

HERMAN BARBER, OF ELWOOD, INDIANA.

LIQUID-DISTRIBUTING APPARATUS.

No. 855,496.

Specification of Letters Patent.

Patented June 4, 1907.

Application filed October 26, 1906. Serial No. 340,655.

*To all whom it may concern:*

Be it known that I, HERMAN BARBER, a citizen of the United States, residing at Elwood, in the county of Madison and State of Indiana, have invented new and useful Improvements in Liquid-Distributing Apparatus, of which the following is a specification.

This invention is an apparatus for distributing liquids by means of a tank and air pressure supplied thereto. It is particularly adapted for use as a sprayer for paints, white-wash, and the like, or for spraying trees, plants, etc.; also as a so-called chemical fire extinguisher adapted for the transportation and discharge of liquid fire extinguishing compounds.

The invention is illustrated in the accompanying drawings, in which

Figure 1 is a top plan view thereof. Fig. 2 is a central vertical section. Fig. 3 is a side elevation. Fig. 4 is a detail in side view of a bottle for holding acids when the apparatus is used as a fire extinguisher.

The frame of the device consists of an axle 6, wheels 7, and curved side bars 8 connected at opposite ends by cross bars 9. The side bars are bowed up at the ends, from the axle, so as to support the tank above the axle. There is one cross bar 9 at one end of the side bars and two at the other. Truss rods 10 are connected across from one end of the side bars to the other, to support said bars, and the rods are threaded and provided with nuts 11, so that the bearings of the tank can be tightened or loosened. Thus by loosening the nuts the ends of the side bars can be sprung apart and the tank removed from its bearings.

A cylindrical tank 12 is mounted upon trunnions 13 between the cross bars 9. The trunnion 13 at one end is hollow, and rests in a bearing box 14 mounted upon one of the cross bars 9. The bearing box is threaded for a portion of its length, to receive a screw coupling 15 which screws therein. This coupling carries a discharge pipe 16 which extends therethrough, and the inner end of the discharge pipe is curved as at 17 so that its mouth is close to the lower wall or corner of the tank, whereby practically all the liquid in the tank may be discharged. A hose 18 is connected to the outer end of the discharge pipe and may be extended to any desired length.

The trunnion at the opposite end of the tank is extended and bent to form a crank 19 and a crank handle 20, and is carried in bearings 21 upon the cross bars 9 at that end. The crank works in a slotted link 22 which is connected to oppositely-extending piston rods 23 carrying pistons 24 which work in the air pump cylinders 25 which are mounted and strapped upon the frame of the machine. The air pumps have discharge pipes 26 which extend along opposite sides of the frame to connection with a T 27 which is tapped into a hole which extends through the screw coupling 15 and opens into the trunnion 13 and thence into the tank.

The tank has a filling hole in the side, closed by a screw plug 28, and this plug is provided on its inner end with a bottle holder consisting of a pair of arms 29 and a strap 30 adapted to encircle the neck of a bottle 31, the bottle being long and narrow so that it may be inserted through the filling hole. A valve for the mouth of the bottle is provided, consisting of a disk 32 having a screw stem 33 which is tapped through the plug 28 and provided on the outside with a head 34 whereby the valve may be advanced or retracted to close or open the mouth of the bottle.

When used as a spraying apparatus for plants, white-wash and the like, the bottle is removed, and if necessary, a plain plug may be substituted for the plug having the bottle holder, and in this use a stirrer is also preferably provided, consisting of a loose metal bar 35 placed within the tank and free to roll around therein when the tank is rotated.

The tank having been filled with the liquid, when the crank is turned the operation of the pumps will force air into the tank through the pipes 26 and the screw coupling 15, and the air pressure will force out the liquid through the pipe 16 and hose 18. The same operation of the crank handle causes the tank to rotate, thereby effectively stirring its contents, thereby preventing the precipitation of any solid constituents of the composition being used.

For use as a fire extinguisher, with the ordinary fire extinguishing compound, the water and soda are placed in the tank and the screw plug carrying the bottle is put in place. In case of fire, the apparatus is hauled to the locality and the valve 32 is then opened. Rotation of the tank by means of the crank will then cause the acid to spill from the bottle into the tank, thereby forming the fire extinguishing compound which is discharged through the hose by the pressure of the gas generated and also by the air pressure supplied by the pumps. In this use, the stirrer 35 is omitted so as to not break the bottle.

It will be seen that the operation of the crank shown produces both reciprocation of the pump pistons and rotation of the tank, thereby performing all operations by a single power device. The rotation of the tank produces a desirable intimate mixture of the ingredients of the compound, whether it be a poisonous compound for plants, a fire extinguishing compound, or otherwise.

I claim:

1. In a liquid distributing apparatus, in combination, a wheeled frame, a rotatable mixing tank and an air pump mounted on said frame, the pump and tank being connected at the axis of the tank and the tank also having a discharge outlet at said axis, and means independent of the travel of the wheeled frame to rotate the tank and operate the pump.

2. In a liquid distributing apparatus, in combination, a frame, a mixing tank having trunnions mounted in bearings on said frame, one of said trunnions being hollow and the other being extended and provided with a crank, and also with a crank handle, an outlet pipe extending through the hollow trunnion into the tank, and an air pump operatively connected to the crank and having its delivery pipe extending into the hollow trunnion, to force air into the tank.

3. In a liquid distributing apparatus, in combination, a frame, a rotatable tank having trunnions mounted in bearings on the frame, one of the trunnions being hollow and the other having a crank thereon, a coupling connected to the hollow trunnion, a discharge pipe extending through the coupling and trunnion into the tank, oppositely arranged air pumps on the frame, having discharge pipes opening through the coupling into the tank, and having pistons connected to and operated by the crank, and means to rotate the tank.

In testimony whereof I have signed my name to this specification in the presence of two subscribing witnesses.

HERMAN BARBER.

Witnesses:
  JOHN ENGLEHART,
  ANNA B. FIELD.